3,317,522
ANILINE CHROMIUM TRICARBONYLS AND PREPARATION OF SAME
Mark Crosby Whiting, Oxford, England, assignor to Ethyl Corporation, New York, N.Y., a corporation of Virginia
No Drawing. Filed Mar. 11, 1963, Ser. No. 264,025
Claims priority, application Great Britain, Mar. 12, 1962, 9,364/62
29 Claims. (Cl. 260—242)

This invention relates to aniline chromium tricarbonyl compounds and methods for their preparation.

An object of this invention is to prepare aniline chromium tricarbonyl compounds from amines and fluoroarene chromium tricarbonyls. A further object is to provide a process for preparation of aniline chromium tricarbonyls in high yields when the amine reactant is used in excess. Another object is to provide a process for preparing high yields of aniline chromium tricarbonyls when the fluoroarene chromium tricarbonyl compound is used in slight excess. Still another object is to provide catalytic and promoted processes for the preparation of aniline chromium tricarbonyls. Another object is to provide a new class of arene chromium tricarbonyls.

It has been discovered that a wide variety of amines react smoothly with fluoroarene chromium tricarbonyls to form excellent yields of aniline and substituted aniline chromium tricarbonyls if alcoholic solvents are excluded. This reaction, an $S_N2$ displacement, can be characterized as follows:

$$HNR_1R_2 + F{-}C_6H_5 \cdot Cr(CO)_3 \rightarrow R_1R_2N{-}C_6H_5 \cdot Cr(CO)_3 + HF$$

$R_1$ and $R_2$ = hydrogen or an organic radical.

The effect of alcoholic solvents on the rates of $S_N2$ displacements is known in the case of anions. However, such an effect is not known in the case of amines. In fact, it has been recently reported that this effect is not observed in the case of pyridine/butyl bromide, and the dipolar protic-aprotic solvent effect observed in $S_N2$ reactions only occurs when at least one reactant is an anion, Parker, J.C.S. 4398 (1961).

Three major embodiments of my invention for the preparation of aniline chromium tricarbonyls comprise:

(1) Reaction of a suitable fluoroarene chromium tricarbonyl compound with an excess of a reactive or moderately active primary or secondary amine;
(2) Reaction of a suitable fluoroarene chromium tricarbonyl compound with a silghtly reactive primary or secondary amine in the presence of a highly polar solvent, and
(3) Reaction of a reactive or moderately active primary or secondary amine with a slight excess of a suitable fluoroarene chromium tricarbonyl compound in the presence of a silghtly reactive amine and a polar solvent.

The novel compounds of this invention have the formula

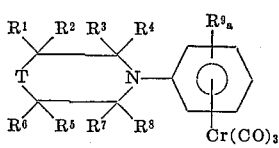

wherein T is selected from the class consisting of a $CH_2$ group and an oxygen atom (O). When T is a $CH_2$ group, the compounds are piperidinylbenzene chromium tricarbonyls, and when T is an oxygen atom, the compounds are morpholinylbenzene chromium tricarbonyls. The radicals $R^1$ to $R^8$ can be any stable, non-reactive organic substituent. Preferably, the side chains are not so bulky as to seriously hinder the reaction used for their preparation. The most preferred compounds are those wherein $R^2$, $R^4$, $R^6$ and $R^8$ are hydrogen atoms. Examples of other applicable substituents (other than hydrogen) are alkyl, alkoxy, carboalkoxy, halo radicals, and the like. The most preferred substituents are alkyl radicals having one to four carbon atoms.

$R^9$ is an alkyl radical having from one to four carbon atoms. The integer $a$ has a value from zero to three such that the number of carbon atoms within the side chains on the benzene ring ($R^9$) does not exceed four carbon atoms. The most preferred compounds are piperidinylbenzene chromium tricarbonyl and morpholinylbenzene chromium tricarbonyl.

The fluoroarene chromium tricarbonyl compounds applicable in the processes of this invention have an aromatic component containing from six to 10 carbon atoms. Examples of this type of compound include fluorobenzene chromium tricarbonyl and the o, m, and p-fluorotoluene chromium tricarbonyls. Other compounds of this type are fluorosubstituted ethyl and diethylebenzene chromium tricarbonyls, p-fluorobutylbenzene chromium tricarbonyl and the like. Usually higher yields are obtained when fluorobenzene chromium tricarbonyl is used in this process. Hence, this compound is the preferred reactant.

Many reactive and moderately reactive amines such as piperidine, pyrrolidine, methylamine, dimethylamine, morpholine and the like, when employed in large excess, undergo rapid and almost quantitative reactions at room temperature with fluorobenzene chromium tricarbonyl. Satisfactory yields are obtained when other fluoroarene chromium tricarbonyls of the class described above are employed. Hence, the first major embodiment of this invention is:

A process for the preparation of aniline chromium tricarbonyls, said process comprising reacting an excess of a reactive or moderately reactive primary or secondary amine with a fluoroarene chromium tricarbonyl compound having an aromatic ring component containing 6 to 10 carbon atoms, said process being carried out in a substantially alcohol-free system.

Amines which are applicable in this embodiment are primary or secondary amines; that is, derivatives of ammonia having at least one hydrogen atom bonded to the amino nitrogen atom. The organic radicals bonded to the amino nitrogen atom are preferably hydrocarbon radicals. However, amines having radicals having non-hydrocarbon substituent groups are applicable. Preferably, the non-hydrocarbon substituents are stable and nonreactive toward the fluoroarene chromium tricarbonyl employed in the process. Morpholine, chlorocyclohexylamine, and the like are examples of applicable amines which contain non-hydrocarbon substituents. Applicable amines include aliphatic, alicyclic and aralkyl amines. Similarly, secondary amines containing nitrogen in a ring structure can be employed. Preferred amines in this embodiment are methylamine, dimethylamine, diethylamine, n-hexylamine, cyclohexylamine, isopropylamine, benzylamine, piperidine, pyrrolidine, and the like.

Preferred fluoroarene chromium tricarbonyls are fluorobenzene chromium tricarbonyl and o-, m- and p-fluorotoluene chromium tricarbonyls.

This reaction proceeds well when carried out at a temperature within the range of about zero to about 100° C. Lower and higher temperatures can be employed if desired. The preferred temperature range is from about 15 to about 70° C.

Many amines yield satisfactory results when the reaction is carried out at atmospheric pressure. However, pressures as low as 20 mm. and as high as 100 p.s.i. can be employed. It has been found that the preferred reaction pressure in many instances is the autogenous pressure generated by carrying out the reaction in a sealed vessel at elevated temperature.

The reaction time is not a true independent variable but is dependent upon the nature of the reactants and on the other reaction conditions employed. Generally, times within the range of one minute to 100 hours have been found applicable. The preferred reaction time is within the interval of 12 minutes to 30 hours.

A large excess of amine is employed in this process. Generally, from 5 to 50 moles of amine are employed for each mole of fluoroarene chromium tricarbonyl. Higher molar ratios can be employed if desired. For example, up to about 250 moles of amine for each mole of fluoroarene chromium tricarbonyl can be employed, if desired.

To illustrate this process, the following examples and tables are presented. All parts are by weight unless otherwise noted.

stantially identical molar equivalent ratios of benzylamine and fluoroarene chromium tricarbonyl as used in Example I, the following results were obtained. The figures given under the various times are the chromatographed and recrystallized percentage yields respectively. Throughout this specification, the yields are reported in the same manner.

TABLE 1.—PREPARATION OF N-BENZYLANILINE CHROMIUM TRICARBONYL FROM BENZYLAMINE AND VARIOUS FLUOROARENE CHROMIUM TRICARBONYLS

| Fluoroarene Chromium Tricarbonyl | 12 Minutes | | 60 Minutes | | 300 Minutes | | Analysis | | | |
|---|---|---|---|---|---|---|---|---|---|---|
| | | | | | | | | C | H | N |
| Fluorobenzene | 62 | 53 | | | | | Required | 61.25 | 4.54 | 4.20 |
| o-Fluorotoluene | | | 13 | 7 | 42 | 36 | Found | 21.45 | 4.80 | 4.50 |
| m-Fluorotoluene | 27 | 22 | 63 | 54 | | | Found | 61.77 | 4.76 | 4.48 |
| p-Fluorotoluene | | | 31 | 22 | | | Found | 60.70 | 4.55 | 4.03 |

*Example II*

Fluorobenzene chromium tricarbonyl, 92.7 parts, and methylamine, 270 parts, were reacted for 12 minutes at 21±2° C. according to the procedure of Example I. The chromatographed and recrystallized yields of N-methylaniline chromium tricarbonyl were 96 and 84 percent respectively. The melting point of the recrystallized material was 123.5° C.

The following data were obtained from procedures similar to Example I. Each experiment, except where indicated, was carried out with 92.7 parts of fluorobenzene chromium tricarbonyl. The reaction temperature was in each instance 21±2° C. The yields are the chromatographed and recrystallized yields respectively.

TABLE 2.—PREPARATION OF N-SUBSTITUTED ANILINE CHROMIUM TRICARBONYLS

| Amine | Moles [1] | Time | Yield, $C_6H_5NR_2 \cdot Cr(CO)_3$ | | M.P., ° C. | Analysis | | | |
|---|---|---|---|---|---|---|---|---|---|
| | | | | | | | C | H | N |
| Dimethylamine | 15 | 12 min | 96 | 84 | 144.5–155 | | 57.42 | 6.10 | 4.46 |
| n-Hexylamine | 10 | 14 hrs | 95 | 80 | 67–68 | Required/Found | 57.68 | 6.41 | 4.41 |
| Cyclohexylamine | 10 | 22 hrs | 99 | 82 | 132–133 | Required/Found | 57.89 / 58.21 | 5.51 / 5.06 | 4.50 / 4.54 |
| Isopropylamine | 10 | 22 hrs | 98 | 85 | 102–103 | Required/Found | 53.13 / 53.26 | 4.83 / 5.30 | 5.16 / 3.82 |
| Piperidine [2] | 5 | 1 min | 98 | 94 | 125–126.5 | Required/Found | 56.54 / 56.17 | 5.08 / 5.09 | 4.71 / 4.96 |
| Pyrrolidine | 17 | 2 min | 98 | 92 | 161–162 | Required/Found | 55.12 / 55.19 | 4.63 / 4.84 | 4.95 / 4.60 |
| Morpholine | 10 | 18 hrs | 92 | 85 | 171.5–172.5 | Required/Found | 52.17 / 52.38 | 4.38 / 4.84 | 4.68 / 4.29 |

[1] $\frac{\text{Moles of Amine}}{\text{Moles F}-C_6H_5 \cdot Cr(CO)_3}$

[2] 231.75 parts $F-C_6H_5 \cdot Cr(CO)_3$.

*Example I*

Fluorobenzene chromium tricarbonyl, 92.7 parts, and benzylamine, 4.39 parts, were added to a suitable reaction vessel and kept in the dark for 18 hours at 21±2° C. The product, a gel, was extracted with about 16 parts of benzene/light petroleum (1:9 volume/volume). The extract solution was chromatographed on an activated alumina column. Elution of the resultant yellow band gave, after evaporation of the solvent, 128 parts of benzylaniline chromium tricarbonyl (100 percent yield based on the weight of fluorobenzene chromium tricarbonyl). Recrystallization from light petroleum gave 111 parts (87 percent) of pure product, M.P. 129–130° C. Analysis of the recrystallized material, $C_{16}H_{13}NO_3Cr$, requires: C, 60.04; H, 4.27; N, 4.67. Found: C, 60.19; H, 4.10; N, 4.30.

Following the same procedure and employing sub-

Another aspect of this invention is the discovery that slightly reactive (sterically hindered) amines react with fluoroarene chromium tricarbonyls of the class described above to give respectable yields of N-substituted aniline tricarbonyls when compounds having a large dipole moment are added to the reaction mixture. Suitable compounds of this type are acetamide, formamide, dimethylformamide, acetonitrile, dimethylsulfoxide, and the like. Hence, the second major embodiment of this invention is a process for the preparation of aniline chromium tricarbonyls, said process comprising reacting an excess of a slightly reactive primary or secondary amine with a fluoroarene chromium tricarbonyl compound having an aromatic ring component containing 6 to 10 carbon atoms, said process being carried out in the presence of catalytic quantities of a non-alcoholic compound having a large dipole moment and in a substantially alcohol-free system. Because it is substantially unreactive toward fluoroarene chromium tricarbonyls, acetonitrile is the preferred catalyst.

Reactive and moderately reactive amines, such as those exemplified above, are applicable in this embodiment. However, this embodiment is directed to the preparation of satisfactory yields of aniline chromium tricarbonyls which are obtainable in low yield when the first embodiment described above is employed.

The same conditions of temperature, pressure, time, and concentration of reactants previously described are employed in this modification.

The catalyst concentration can be from one to 30 moles of catalyst per mole of fluoroarene chromium tricarbonyl. The preferred catalyst concentration is from 4 to 10 moles per mole of fluoroarene chromium tricarbonyl.

To illustrate this aspect of the invention, the following example is presented in which all parts are by weight.

*Example III*

Fluorobenzene chromium tricarbonyl, 92.8 parts, acetonitrile, 95.6 parts, and diethylamine, 294.6 parts, were sealed in a hard glass tube and heated in the dark at 50° C. for 18 hours. Extraction and chromatography, as in Example I, yielded three bands: (1) unreacted fluorobenzene chromium tricarbonyl, 16 parts, M.P. 87° C. (after recrystallization); (2) N,N-diethylaniline chromium tricarbonyl, 79 parts (64 and 70 percent yield based on original weight of fluorobenzene chromium tricarbonyl), M.P. 113–115° C. (after recrystallization); and (3) N-ethylaniline chromium tricarbonyl, 11 parts (11 percent), M.P. 112–116° C. after recrystallization.

*Analysis.*—N,N-diethylaniline chromium tricarbonyl requires C, 55.02; H, 5.87; N, 4.55. Found: C, 54.71; H, 5.30; N, 4.91. N-ethylaniline chromium tricarbonyl requires: C, 51.57; H, 4.61; N, 5.39. Found: C, 51.37; H, 4.31; N, 5.45.

The yields of N,N-diethylaniline (70 and 64 percent) are markedly superior to the yields obtained when similar procedures were carried out without the addition of a catalyst. The yields in those cases were three and zero percent (at 75° C.) and 11 and 3 percent (at 100° C.).

The molar ratio of acetonitrile catalyst to fluorobenzene chromium tricarbonyl in Example III was 5.8. Following the same procedure as outlined in Example III, with the exception of using a 5.1 mole ratio of acetamide to fluorobenzene chromium tricarbonyl, the yields of N,N-diethylaniline chromium tricarbonyl were 68 and 59 percent. Comparative results were obtained when formamide and dimethylformamide were employed.

When the latter two catalysts were employed and the reaction time decreased to four hours, yields of 32 and 27, and 44 and 37 percent respectively of N,N-diethylaniline chromium tricarbonyl were obtained.

Water and mixed solvents containing water are also applicable in the preparation of aniline chromium tricarbonyls. Typical water/solvent mixtures are water/diethyleneglycol dimethylether, water/dioxane and the like.

For example, when ammonia and fluorobenzene chromium tricarbonyl (mole ratio 250:1) were reacted in the presence of a mixed solvent of water and dioxane (5:8 v./v.) at a temperature of 21±2° C. for 20 hours, aniline chromium tricarbonyl in yields of 19, 15 percent was obtained. Similarly, when ethylamine was reacted with fluorobenzene chromium tricarbonyl (mole ratio 50:1) at 21±2° C. for 12 minutes, N-ethylaniline chromium tricarbonyl was prepared in 81, 71 percent yield.

A further aspect of this invention is the discovery that high yields of N-substituted aniline chromium tricarbonyls can be prepared by reacting the amine with a slight excess of fluoroarene chromium tricarbonyl in the presence of a catalyst of the class described above and a comparatively non-reactive amine.

It has been found that contrary to the essential highly polar nature of the catalysts previously described, the amine promoter need not have a dipole moment. An example of an applicable promoter of this type is the compound triethylenediamine. Another preferred amine promoter is tert-butylamine. By using this procedure, rare and expensive amines yield the corresponding N-substituted aniline chromium tricarbonyl compounds in good yield.

Therefore, a third major embodiment of this invention is a process for the preparation of aniline chromium tricarbonyls, said process comprising reacting a primary or secondary amine with a slight excess of a fluoroarene chromium tricarbonyl compound having an aromatic ring component containing 6 to 10 carbon atoms, said process being carried out in the presence of catalytic quantities of a non-alcoholic compound having a large dipole moment and in the presence of a comparatively non-reactive amine promoter and in the absence of alcohol.

Excess amounts of fluoroarene chromium tricarbonyls can be employed in the presence of the catlyst and/or amine promoter. However, this embodiment is directed to a method for the preparation of aniline chromium tricarbonyls using less than an equivalent amount of amine. Use of a slightly deficient amount of amine is desirable when the amine is rare or expensive.

The same conditions of temperature, pressure and time as described above are used in this modification. However, 1.01 to 2 moles of fluoroarene chromium tricarbonyl is used for each mole of amine. Higher ratios can be employed if desired. Generally, from 3 to 7 moles of amine promoter is used for each mole of amine. When the amine promoter is used in conjunction with a catalyst of the type described above, it has been found that excellent results are obtained when the sum of the moles of promoter and catalyst are equal to about 10 times the moles of amine employed. Higher concentrations of catalyst-promoter can be employed if desired. Usually the molar ratio of catalyst to promoter is about one to one.

*Example IV*

Benzylamine, 40.4 parts, tert-butylamine, 1.33 parts, acetonitrile, 74 parts, and fluorobenzene chromium tricarbonyl, 93.6 parts (mole ratio 38:182:181:40) were kept in a sealed flask in the dark at 21° C. for 90 hours. The gel that had formed was extracted and chromatographed as in Example I. Two fractions were obtained: (1) unreacted fluorobenzene chromium tricarbonyl, 9 parts (4 parts after recrystallization as in Example I), and (2) N-benzylaniline chromium tricarbonyl, 112 parts, 93 and 88 percent. After recrystallization, the melting point was 126–128° C.

*Example V*

Cyclohexylamine, fluorobenzene chromium tricarbonyl, tert-butylamine and acetonitrile (mole ratio 1.00:1.04:4.8:4.7)

were reacted at 21±2° C. for 18 hours following the procedure in Example IV. The yields of N-cyclohexylaniline chromium tricarbonyl were 72 and 64 percent (chromatographed, recrystallized respectively).

A similar mixture (mole ratio 1.00:1.11:4.7:5.5) was reacted for 90 hours. The yields were 95 and 91 percent.

The marked effectiveness of the catalyst-amine promoter system is demonstrated by the following.

When piperidine, fluorobenzene chromium tricarbonyl, and acetonitrile catalyst (molar ratio 1.00:1.05:9.5) were reacted for one hour at 21±2° C., the product, piperidinylbenzene chromium tricarbonyl, was obtained in yields of 48 and 44 percent.

A similar experiment employing the same reactants, time and temperature, but substituting a corresponding equivalent of tert-butylamine promoter for the acetonitrile catalyst (molar ratio 1.00:1.10 to 9.7) gave yields of 75 and 68 percent of the above product.

When piperidine, fluorobenzene chromium tricarbonyl tert-butylamine promoter and acetonitrile catalyst (molar ratio 1.00:1.07:4.9:4.9) were reacted for the same time at the same temperature, the yields were 86 and 79 percent. When no catalyst or promoter was used and the solvent was 9.4 molar equivalents of alcohol and the amine to fluorobenzene complex was 1.05:1.0, the yields were two and zero percent.

The above results demonstrate that aniline chromium tricarbonyls can be prepared when a slight excess of a fluoroarene chromium tricarbonyl compound is employed if a catalyst of the type described above or an amine promoter, as previously described, or a mixture of the catalyst and amine promoter are present in the reaction mixture. Since higher yields of product are obtained if the catalyst is used in conjunction with the amine promoter, this operative expedient is preferred.

Using the combined catalyst, promoter system in conjunction with a slight excess of fluorobenzene chromium tricarbonyl, a temperature of 21±2° C. and a reaction time varying from one to 90 hours as employed in Examples IV and V, piperidinylbenzene chromium tricarbonyl (formerly designated N-piperidenylaniline chromium tricarbonyl), morpholinylbenzene chromium tricarbonyl, N-cyclohexylaniline chromium tricarbonyl, N-n-hexylaniline chromium tricarbonyl, N-benzylaniline chromium tricarbonyl, and N-benzylaniline chromium tricarbonyl have been prepared in yields of 86, 79; 93, 89; 95, 91; 97, 87; 93, 88; and 88, 85 percent respectively from the corresponding amines.

The above results demonstrate that reactive, moderately reactive, and slightly reactive amines are applicable in this embodiment. When the catalyst-amine promoter system described above is employed as a reaction medium, fluorobenzene chromium tricarbonyl reacts with 3-ethyl piperidine, 3,4-dimethylpiperidine, 3,4-diethylpiperidine, and 3,5-dimethylmorpholine to yield 3-ethylpiperidinylbenzene chromium tricarbonyl, 3,4-dimethylpiperidinylbenzene chromium tricarbonyl, 3,5-diethylpiperidinylbenzene chromium tricarbonyl and 3,5-dimethylmorpholinylbenzene chromium tricarbonyl respectively.

The novel compounds of this invention are useful as petroleum additives and biocides such as fungicides, herbicides, bactericides and pesticides.

Other uses of the aniline chromium tricarbonyls prepared by the process of this invention include jet fuel additives, smoke reducer additives for fuels, and chemical intermediates.

Having fully described the novel process of this invention, the novel compounds produced thereby, and their many utilities, it is desired that the invention be limited only within the lawful scope of the appended claims.

I claim:
1. A process for the preparation of an aniline chromium tricarbonyl, said process comprising reacting an excess of an amine having at least one hydrogen atom bonded to the amino nitrogen atom, said amine selected from the class consisting of primary and secondary aliphatic, alicyclic, and aralkyl amines, and secondary amines wherein the amino nitrogen atom is within a ring structure, with a fluoroarene chromium tricarbonyl selected from the class consisting of fluorobenzene chromium tricarbonyl, o-fluorotoluene chromium tricarbonyl, m-fluorotoluene chromium tricarbonyl, and p-fluorotoluene chromium tricarbonyl, said process being carried out in a substantially alcohol-free system.

2. The process of claim 1 wherein said fluoroarene chromium tricarbonyl is fluorobenzene chromium tricarbonyl.

3. A process for the preparation of an aniline chromium tricarbonyl, said process comprising reacting an excess of an amine having at least one hydrogen atom bonded to the amino nitrogen atom; said amine selected from the class consisting of primary and secondary aliphatic, alicyclic and aralkyl amines, and secondary amines wherein the amino nitrogen atom is within a ring structure, with a fluoroarene chromium tricarbonyl selected from the class consisting of fluorobenzene chromium tricarbonyl, o-fluorotoluene chromium tricarbonyl, m-fluorotoluene chromium tricarbonyl, and p-fluorotoluene chromium tricarbonyl, said process being carrid out in the presence of a catalytic quantity of a non-alcoholic compound having a large dipole moment selected from the class consisting of acetamide, formamide, dimethylformamide, and acetonitrile, and in a substantially alcohol-free system.

4. The process of claim 3 wherein said fluoroarene chromium tricarbonyl is fluorobenzene chromium tricarbonyl.

5. The process of claim 4 wherein said catalyst is acetonitrile.

6. Process for the preparation of N-ethylaniline chromium tricarbonyl and N,N'-diethylaniline chromium tricarbonyl, said process comprising reacting fluorobenzene chromium tricarbonyl with an excess of diethylamine, said process being carried out in the presence of catalytic quantities of acetonitrile and in a substantially alcohol-free system.

7. Process for the preparation of aniline chromium tricarbonyl, said process comprising reacting an excess of ammonia with fluorobenzene chromium tricarbonyl in the presence of a solvent consisting of a mixture of water and dioxane, and in a substantially alcohol-free system.

8. Process for the preparation of an aniline chromium tricarbonyl, said process comprising reacting an amine selected from the class consisting of benzylamine, cyclohexylamine, piperidine, morpholine and n-hexylamine, with a slight excess of a fluoroarene chromium tricarbonyl selected from the class consisting of fluorobenzene chromium tricarbonyl, o-fluorotoluene chromium tricarbonyl, m-fluoro toluene chromium tricarbonyl, and p-fluorotoluene chromium tricarbonyl, said process being carried out in the presence of catalytic quantities of a non-alcoholic compound having a large dipole moment selected from the class consisting of acetamide, formamide, dimethylformamide, acetonitrile, and dimethylsulfoxide and an amine promoter selected from the class consisting of diethylenediamine and tert-butylamine, said process being carried out in a substantially alcohol-free system.

9. Process for the preparation of N-cyclohexylaniline chromium tricarbonyl, said process comprising reacting cyclohexylamine with a slight excess of fluorobenzene chromium tricarbonyl in the presence of catalytic quantities of tert-butylamine and acetonitrile, said process being carried out in a substantially alcohol-free system.

10. Process for the preparation of N-benzylaniline chromium tricarbonyl, said process comprising reacting fluorobenzene chromium tricarbonyl with an excess of benzylamine in a substantially alcohol-free system.

11. The process of claim 10 carried out in the presence of a liquid reaction medium consisting of a mixture of benzene and light petroleum ether.

12. Process for the preparation of o-methylbenzylaniline chromium tricarbonyl, said process comprising reacting o-fluorotoluene chromium tricarbonyl with an excess of benzylamine in a substantially alcohol-free system.

13. Process for the preparation of m-methylbenzylaniline chromium tricarbonyl, said process comprising reacting m-fluorotoluene chromium tricarbonyl with an excess of benzylamine in a substantially alcohol-free system.

14. Process for the preparation of p-methylbenzylaniline chromium tricarbonyl, said process comprising reacting p-fluorotoluene chromium tricarbonyl with an excess of benzylamine in a substantially alcohol-free system.

15. Process for the preparation of N-methylaniline chromium tricarbonyl, said process comprising reacting fluorobenzene chromium tricarbonyl with an excess of methylamine in a substantially alcohol-free system.

16. Process for the preparation of N,N-dimethylaniline chromium tricarbonyl, said process comprising reacting fluorobenzene chromium tricarbonyl with an excess of dimethylamine in a substantially alcohol-free system.

17. Process for the preparation of N-n-hexylaniline chromium tricarbonyl, said process comprising reacting fluorobenzene chromium tricarbonyl with an excess of n-hexylamine in a substantially alcohol-free system.

18. Process for the preparation of N-cyclohexylaniline chromium tricarbonyl, said process comprising reacting fluorobenzene chromium tricarbonyl with an excess of cyclohexylamine in a substantially alcohol-free system.

19. Process for the preparation of N-isopropylaniline chromium tricarbonyl, said process comprising reacting fluorobenzene chromium tricarbonyl with an excess of isopropylamine in a substantially alcohol-free system.

20. Process for the preparation of N-piperidinylbenzene chromium tricarbonyl, said process comprising reacting fluorobenzene chromium tricarbonyl with an excess of piperidine in a substantially alcohol-free system.

21. Process for the preparation of pyrrolidinylbenzene chromium tricarbonyl, said process comprising reacting fluorobenzene chromium tricarbonyl with an excess of pyrrolidine in a substantially alcohol-free system.

22. Process for the preparation of morpholinylbenzene chromium tricarbonyl, said process comprising reacting fluorobenzene chromium tricarbonyl with an excess of morpholine in a substantially alcohol-free system.

23. Process for the preparation of N-benzylaniline chromium tricarbonyl, said process comprising reacting benzylamine with fluorobenzene chromium tricarbonyl in the presence of tert-butylamine and acetonitrile and in a substantially alcohol-free system.

24. Process for the preparation of piperidinylbenzene chromium tricarbonyl, said process comprising reacting piperidine with fluorobenzene chromium tricarbonyl in the presence of acetonitrile and tert-butylamine, and in a substantially alcohol-free system.

25. Process for the preparation of N-cyclohexylaniline chromium tricarbonyl, said process comprising reacting cyclohexylamine with a slight excess of fluorobenzene chromium tricarbonyl in the presence of acetonitrile and tert-butylamine and in a substantially alcohol-free system.

26. Process for the preparation of morpholinylbenzene chromium tricarbonyl, said process comprising reacting morpholine with a slight excess of fluorobenzene chromium tricarbonyl in the presence of acetonitrile and tert-butylamine and in a substantially alcohol-free system.

27. An aniline chromium tricarbonyl having the formula

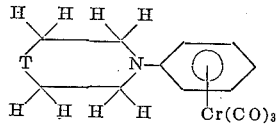

wherein T is selected from the class consisting of $H_2C$ and an oxygen atom.

28. N-piperidinylbenzene chromium tricarbonyl.

29. N-morpholinylbenzene chromium tricarbonyl.

References Cited by the Examiner

UNITED STATES PATENTS 2,916,490 12/1959 Schenck et al. _____ 260—247
3,225,071 12/1965 Whiting _____ 260—294

OTHER REFERENCES

Noller, Chemistry of Organic Compounds (textbook), 2nd Ed., p. 478 (1957).

Parker et al., "Quarterly Reviews," vol. 16, pp. 163–187 (1962).

WALTER A. MODANCE, Primary Examiner.

ROBERT T. BOND, R. L. PRICE, Examiners.